US008150385B1

(12) United States Patent
Majeti et al.

(10) Patent No.: US 8,150,385 B1
(45) Date of Patent: Apr. 3, 2012

(54) AUTOMATED REPLY MESSAGES AMONG END USER COMMUNICATION DEVICES

(75) Inventors: Venkata C. Majeti, Naperville, IL (US); Saiprasad Pennabadi, Naperville, IL (US); Sri Sharmila Sripada, Naperville, IL (US)

(73) Assignee: Loment, Inc., Naperville, IL (US)

( * ) Notice: Subject to any disclaimer, the term of this patent is extended or adjusted under 35 U.S.C. 154(b) by 0 days.

(21) Appl. No.: 13/068,339

(22) Filed: May 9, 2011

(51) Int. Cl.
*H04M 3/00* (2006.01)
(52) U.S. Cl. ......... 455/418; 455/420; 455/458; 709/206
(58) Field of Classification Search .................. 455/418, 455/419, 403, 420; 709/206
See application file for complete search history.

(56) References Cited

U.S. PATENT DOCUMENTS 7,539,488 B2 * 5/2009 Friedman ...................... 455/420
2009/0106367 A1 * 4/2009 Banerjee et al. .............. 709/206
* cited by examiner

*Primary Examiner* — Phuoc Doan
(74) *Attorney, Agent, or Firm* — Carmen Patti Law Group, LLC

(57) ABSTRACT

An exemplary method processes an electronic communication received by a first end-user communication device. A communication, received by the first end-user communication device, is a digital message sent from a second end-user device. A message processing program includes an auto-reply generation method that is active to automatically transmit a predetermined reply message to another device upon receipt of a message from it. A list of origination addresses to which the predetermined reply message has previously been transmitted is stored in memory. On receipt of the digital message from the second end-user device, a determination is made if the origination address of the second end-user device is in the list of origination addresses. If it is in the list of origination addresses, the auto-reply generation method is inhibited from transmitting the predetermined reply message. If it is not in the list of origination addresses, the origination address of the second end-user device is added to the list and the auto-reply generation method is permitted to transmit the predetermined reply message to the origination address of the second end-user device.

14 Claims, 3 Drawing Sheets

AUTOMATED REPLY MESSAGES AMONG END USER COMMUNICATION DEVICES

BACKGROUND

This invention relates to communications among end user communication devices and more specifically to automated replies generated by an end user communication device in response to the receipt of a message.

Wireless communication devices are now prevalent throughout all developed countries of the world. Although cellular telephones are currently the most widespread, other types of wireless communication devices include personal digital assistants, laptop computers with Wi-Fi and/or telecommunication carrier communication support, and various types of "pads" that provide visual displays that are larger than conventional cellular telephones but typically smaller than the displays of a laptop computer. Wireless data communications between mobile devices utilizing different types of communication protocols, e.g. analog, TDMA, CDMA, VOIP, etc., are supported by different telecommunication carriers which provide appropriate communication protocol interfaces/gateways to facilitate data communications, e.g. character based messaging, between mobile units using different communication protocols. For example, short messaging service (SMS), multimedia messaging service (MMS), email such as by simple mail transfer protocol (SMTP), and instant messaging utilizing hypertext transfer protocol (HTTP) are available.

Character based messaging applications reside on end user devices as well as being supported by servers, e.g. web based email, etc. Some applications support the ability to automatically transmit, upon receipt of a message, a predetermined reply message to the originator of the received message. For example, the automated reply message may advise the originator that the recipient is unavailable, e.g. on vacation for 1 week. However, if the originator has set his message client to auto-respond, then a so called endless loop may result where the two message clients continue to send automated messages to each other in response to the receipt of the other's automated message.

SUMMARY

It is an object of the present invention to overcome this issue.

An exemplary method processes an electronic communication received by a first end-user communication device. A communication, received by the first end-user communication device, is a digital message sent from a second end-user device. A message processing program includes an auto-reply generation method that is active to automatically transmit a predetermined reply message to another device upon receipt of a message from it. A list of origination addresses to which the predetermined reply message has previously been transmitted is stored in memory. On receipt of the digital message from the second end-user device, a determination is made if the origination address of the second end-user device is in the list of origination addresses. If it is in the list of origination addresses, the auto-reply generation method is inhibited from transmitting the predetermined reply message. If it is not in the list of origination addresses, the origination address of the second end-user device is added to the list and the auto-reply generation method is permitted to transmit the predetermined reply message to the origination address of the second end-user device.

The present invention includes the end-user communication device that executes this method.

The present invention also includes a computer program product, comprising a computer usable tangible medium having a computer readable program code embodied therein, where the computer readable program code is adapted to be executed to implement this method.

DESCRIPTION OF THE DRAWINGS

Features of exemplary implementations of the invention will become apparent from the description, the claims, and the accompanying drawings in which:

DETAILED DESCRIPTION

Figure 1:
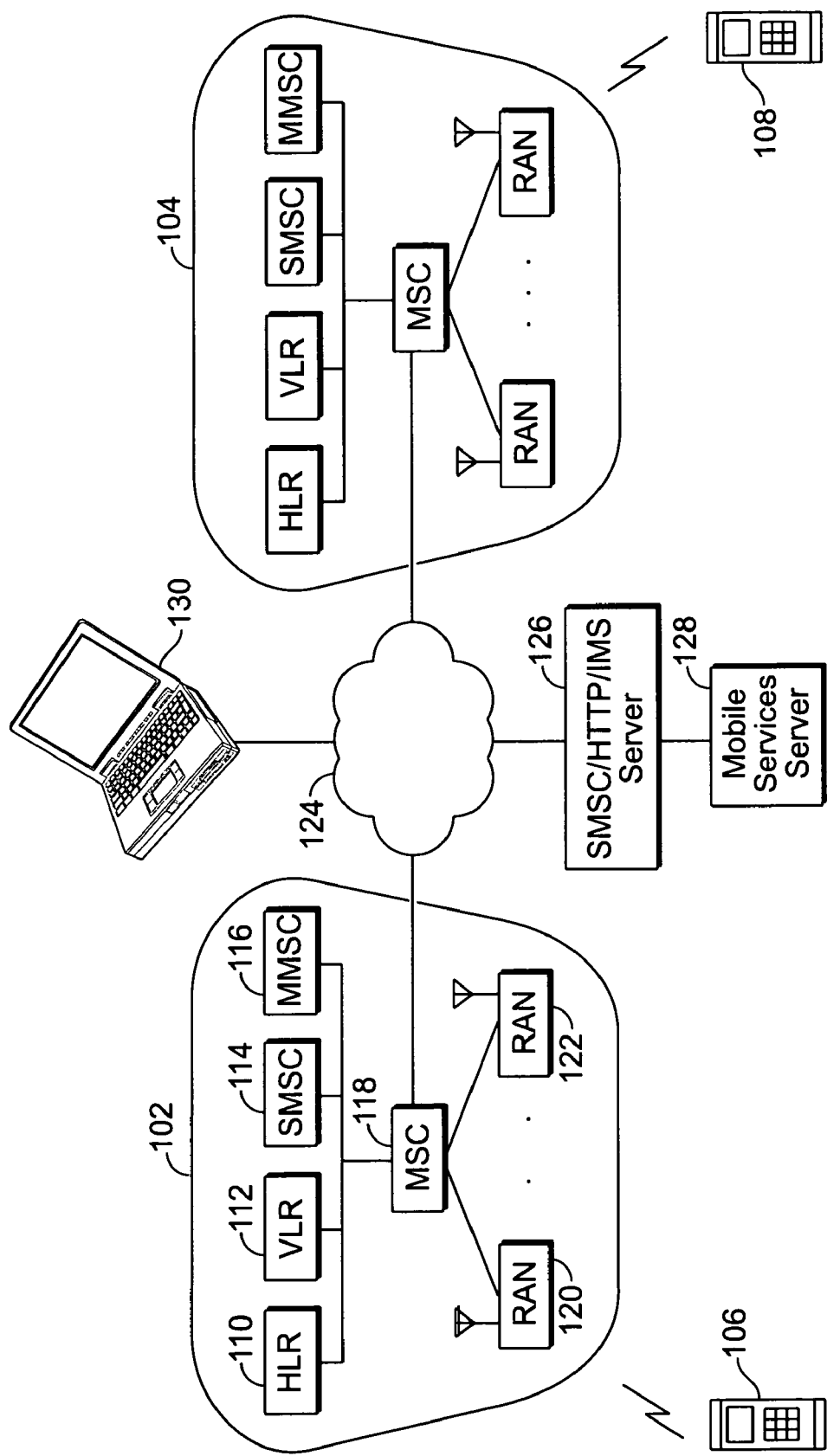
FIG. 1 is a block diagram of an illustrative communication system suited for supporting an embodiment of the present invention.

Referring to FIG. 1, wireless communication systems 102 and 104 support communications with a plurality of wireless mobile devices including exemplary wireless mobile devices (units) 106 and 108, respectively. The communication system 102 includes a home location register (HLR) 110 that serves as an operations and administration center for registered wireless mobile devices and includes information of the current location of the respective mobile devices. A visitor location register (VLR) 112 provides temporary registration and location services for wireless mobile devices located in a communication system that is not the home system for the mobile device. A short messaging service center (SMSC) 114 functions as a server for the transmission and reception of SMS messages for wireless mobile devices supported by communication system 102. A multimedia service center (MMSC) 116 provides a similar function to SMSC 114 for the transmission and reception of multimedia information for wireless mobile devices supported by communication system 102. These nodes/elements perform their known functions as part of the infrastructure that supports wireless mobile communications. A mobile switching center (MSC) 118 provides switching for voice and data communications associated with the supported wireless mobile devices. A plurality of radio access nodes (RANs) 120 and 122 provide a wireless communications link between the system 102 and the supported wireless mobile units. Each RAN is connected to the MSC 118 wherein wireless messages received from a mobile unit by a RAN are transferred to MSC 118 for further routing, and messages to be delivered to a mobile unit are transferred from the MSC 118 to a RAN where such messages are then wirelessly transmitted by the RAN to the destination mobile unit. The elements of communication system 104 are the same as elements in communication system 102 and provide the same functionality for the respective supported mobile units. Hence, the elements of communication system 104 need not be described in detail.

A communication network 124 provides a communication link between the MSCs of systems 102 and 104. Communications with an exemplary SMSC/HTTP/IMS server 126 is also supported by network 124, where HTTP means hypertext transfer protocol and IMS means Internet map server. A mobile services server 128 is supported by server 126 and facilitates enhanced capabilities for wireless mobile units in accordance with an embodiment of the present invention. For example, wireless mobile units may access and download an application program from server 128 that can be installed and operate on the wireless mobile unit to provide enhanced functionality and control of user data in accordance with an embodiment of the present invention. This will be described in greater detail below. Another end user communication device 130, which may comprise a computer or other device, is connected to the communication network 124 by other than a wireless communication link, e.g. a wire internet link through an IP service provider.

Figure 2:
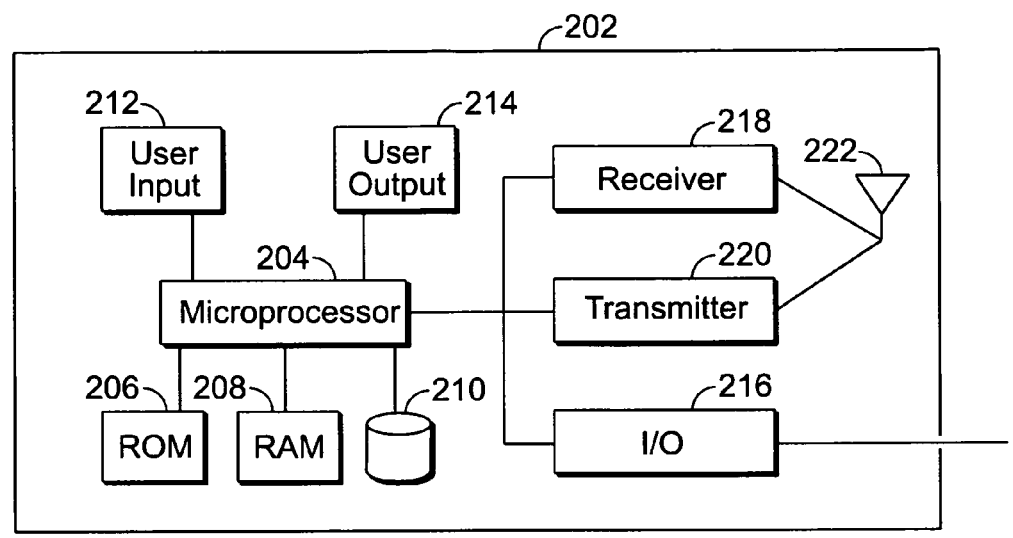
FIG. 2 is a block diagram of an exemplary device in accordance with the present invention.

FIG. 2 shows an exemplary block diagram of a device 202 which represents an end user wireless or wired device as explained below. A microprocessor 204 performs processes and tasks based on stored program instructions. It is supported by read-only memory (ROM) 206, random access memory (RAM) 208 and nonvolatile data storage device 210. As will be understood by those skilled in the art, data and stored program instructions in ROM 206 is typically utilized by microprocessor 204 to initialize and boot the computing apparatus. An application program, e.g. a program that controls the implementation of one or more functions performed by the device, is stored in storage element 210. At least active portions of the application program will be typically stored in RAM 208 for ready access and processing by microprocessor 204. The application program is specific to the functions to be performed by the device, and performs the functions and steps as described herein. A variety of user inputs 212 such as a keyboard, keypad, touchpad and/or mouse can be utilized to control the operation of the device and the application running on it. User outputs 214, e.g. a display monitor or screen, provide output for the user of the device. An input/output (I/O) module 216 provides a communication interface permitting microprocessor 204 to transmit and receive data with external nodes.

Where device 202 represents a wireless mobile unit, a radio frequency receiver 218, transmitter 220 and an antenna 222 are also present and used for wireless communications between the unit and supporting RANs. The I/O module 216 supports communications with supporting external peripherals, e.g. USB communications with a peripheral. When device 202 represents a wireless mobile unit, the application program controlling the microprocessor 204 is supported by an operating system and includes an enhanced services (ES) application program such as downloaded from server 128 and installed in the wireless unit. In this case, the user will be the person using the wireless mobile unit. The ES application program provides the wireless mobile unit with functions as explained below as well as an automated reply function.

Figure 3:
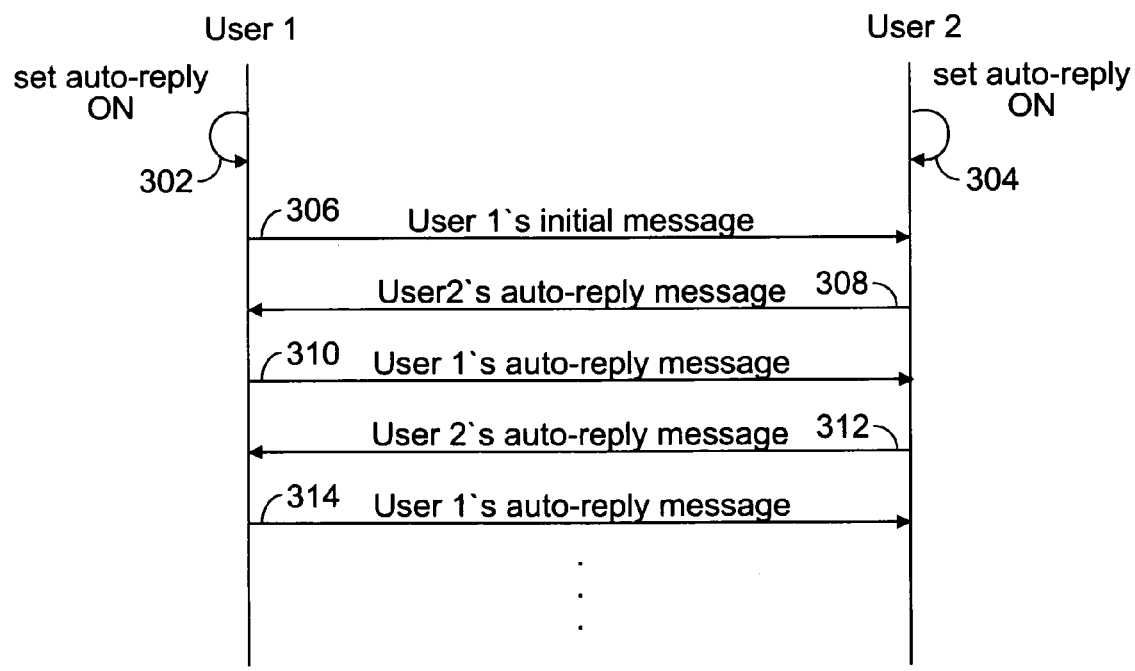
FIG. 3 is a signal flow diagram illustrating the endless loop of messages due to the auto-reply functions being active in both origination and destination communication devices.

FIG. 3 is the signal flow diagram illustrating an endless loop of messages due to the auto-reply function being active at both the origination and destination communication devices. In this example, user 1 may be associates with wireless communication device 106 and user 2 with wireless communication device 108. Each of these devices includes a message handling client that supports an auto-reply feature. Both user 1 and user 2 have set the auto-reply feature to ON on their respective devices as indicated at 302 and 304, respectively. User 1 sends an initial message 306 to user 2. Because the auto-reply feature on the device of user 2 is ON, the receipt of this message causes the automatic generation and transmission of user 2's auto-reply message 308 to user 1. Because the auto-reply feature on the device of user 1 is also ON, the receipt of message 308 causes the automatic generation and transmission of user 1's auto-reply message 310 to user 2. Likewise, auto-reply messages 312, 314, etc. are automatically transmitted back and forth between the devices of user 1 and user 2 in a so-called endless loop. Such a process consumes unnecessary power and bandwidth resources.

Figure 4:
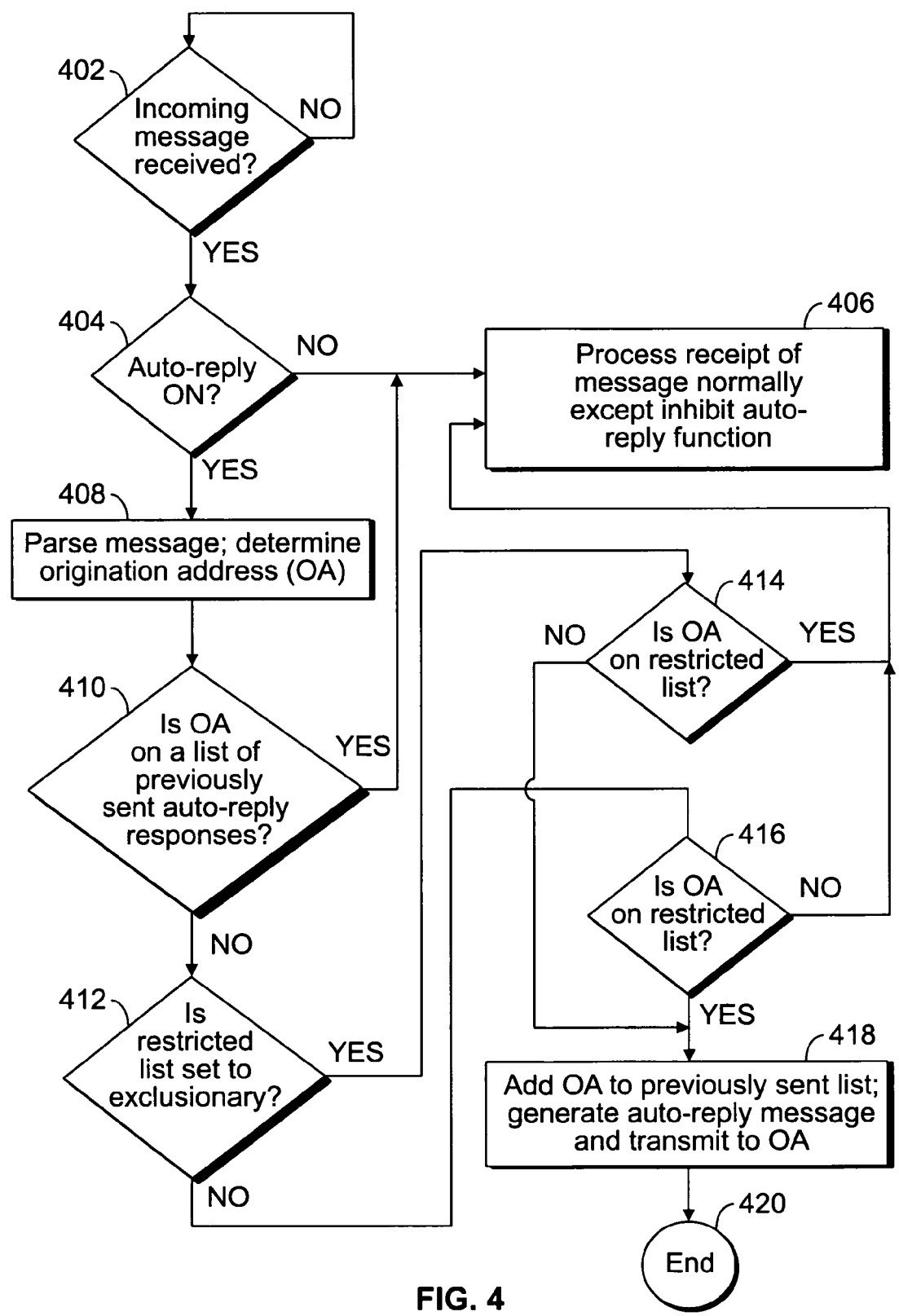
FIG. 4 is a flow diagram of a method practiced by an end user communication device that prevents an endless auto-reply loop in accordance with an embodiment of the present invention.

FIG. 4 is a flow diagram of a method in accordance with an embodiment of the present invention practiced by an end user communication device that prevents an auto-reply function from going into an endless loop. In step 402 a determination is made of whether an incoming message has been received. A NO determination by the step maintains processing by this step until a message has been received. A YES determination results in processing by step 404 in which a determination is made of whether the auto-reply function is ON. A NO determination by step 404 results in processing the received message normally as indicated at step 406. That is, the incoming message will be processed in accordance with the normal message handling client of the destination device with the auto-reply function being inactive/OFF. A YES determination by step 404 results in the incoming message being parsed and the origination address of the incoming message determined at step 408. In step 410 a determination is made if the origination address is on a list of auto-reply responses previously sent by the subject device. In accordance with the embodiment of the present invention, a list of origination addresses is stored in memory as a table and/or file of all previously sent auto-replies transmitted from the subject device. The determination of step 410 is made by comparing the originating address of the current incoming message to each of the originating addresses stored in the list.

A YES determination by step 410 results in the incoming message being processed normally other than the auto-reply function not being utilized, i.e. the active auto-reply function is inhibited from generating an auto-reply message, for the subject message. A NO determination by step 410 results in the determination by step 412 of whether a restricted list is set to exclusionary. In accordance with an embodiment of the present invention the restricted list is stored in memory as a table and/or file, where each entry in the restricted list contains an electronic communication address or parts of an address of a party to whom the auto-reply message should or should not be transmitted. The restricted list may be permissive, i.e. allowing only auto-reply responses to be transmitted to parties having addresses or portions of the addresses contained in the list, or exclusionary, i.e. inhibiting auto-reply responses from being transmitted to parties having addresses or portions of addresses contained in the list. The address entries in the restricted list may be manually entered by the user or imported under the control of the user from a file. The user controls whether the restricted list is set to exclusionary or permissive, and when the restricted list should be cleared. For example, a particular restricted list may be cleared upon deactivation of the auto-reply function. Upon setting up a new auto-reply message and activating the auto-reply function, the user can enter the information into the restricted list and designate whether it is to act as permissive or exclusionary. A YES determination by step 412, indicating that the restricted list is set to exclusionary, results in a determination by step 414 of whether the origination address or parts of the origination address are contained in the list. Since it was determined that the restricted list is exclusionary, a YES determination by step 414 results in further processing by step 406 in which an auto-reply is inhibited, i.e. not generated. A NO determination by step 412, indicating that the restricted list is set to permissive, results in a determination by step 416 of whether the origination address or parts of the origination address are contained in the list. Since it was determined that the restricted list is permissive, a NO determination by step 416 results in further processing by step 406 in which an auto-reply is not generated. A NO determination by step 414 or a YES determination by step 416 results in further processing by step 418 in which the subject origination address is added to the list of previously sent auto-replies, an auto-reply message is generated and transmitted from the subject user's device to the origination address of the received message. Processing terminates at END 420.

For a permissive example of the restricted list, a user who is an employee of a corporation may desire to automatically transmit an auto-reply congratulatory greeting to only other members of the corporation in recognition of an achievement reached by the corporation. In this case, the restricted list can be designated as permissive on the subject party's communication device with the Internet domain name of the corporation being listed as a required part of the incoming origination address so that the auto-reply message will only be generated in response to messages received from others with the same corporation domain. In another example, the restricted list may operate in the exclusionary mode. This can be utilized where the user desires to generate the auto-reply message in response all received messages except for a specified party or groups of parties. [Help needed: can you provide an appropriate example for such exclusionary usage?]

Maintaining a list of the addresses to which previously generated auto-reply responses have been sent and checking the address of each received message against the addresses on this list can be utilized to prevent the transmission of multiple auto-reply messages to the same address. Referring to the example in FIG. 3, the use of an embodiment of the present invention by either user 1 or user 2 will prevent the auto-response endless loop situation. If user 2 utilized an embodiment of the present invention, auto-reply message 308 could be transmitted to user 1 depending upon the restriction list function. However, even if the restriction list function is satisfied at the device of user 2 to permit auto-replies to user 1, the illustrated auto-reply message 312 would not be transmitted by user 2 since the address of user 1 would have been added to the list of previously sent auto-reply responses in connection with the transmission of previously sent auto-reply message 308 which would cause a determination by step 410 to be made that would inhibit the further transmission of any auto-reply messages.

A similar restriction on the generation of auto-reply responses by the device of user 1 in response to receipt of messages from user 2 would be implemented if the device of user 1 utilized an embodiment of the present invention and if the device of user 2 did not utilize embodiment of the present invention. If the devices of user 1 and user 2 both utilize an embodiment of the present invention, then user 2's device will generate a single auto-reply message 308 and user 1's device will generate a single auto-reply message 310. That is, further auto-reply messages 312, 314, etc. would not be generated even though the auto-reply function is active on both devices and additional messages are received from the other party's communication address.

It will be noted that the embodiment of the present invention need only be implemented at one end-user communication device in order to prevent an auto-reply endless loop situation with any of a plurality of other end-user devices even where such other end-user devices are susceptible to an auto-reply endless loop.

The wireless mobile unit in one example employs one or more computer-readable signal-bearing tangible media. The computer-readable signal-bearing tangible media store software, firmware and/or assembly language for performing one or more portions of one or more embodiments of the invention. The computer-readable signal-bearing tangible medium may contain stored data in the form of magnetic, electrical, optical, biological, and atomic information. For example, the computer-readable signal-bearing tangible medium comprise floppy disks, magnetic tapes, CD-ROMs, DVD-ROMs, hard disk drives, and electronic memory.

Although exemplary implementations of the invention have been depicted and described in detail herein, it will be apparent to those skilled in the art that various modifications, additions, substitutions, and the like can be made without departing from the spirit of the invention. For example, the above described method is applicable to all alphanumeric character based communications, e.g. SMS text messages, MMS communications, email communications, etc. The use of the further restricted list is not needed in order to solve the endless loop of auto-reply messages. The transmission medium is not limited to radio frequency wireless communications, and could include wire or cable communications as well as wireless infrared, optical fiber, etc.

The scope of the invention is defined in the following claims.

We claim:

1. A method implemented by a first end-user communication device for processing a received electronic character-based communication, the method comprising the steps of:

receiving the electronic character-based communication by the first end-user communication device where the electronic character-based communication comprises a digital message sent from a second end-user device, the electronic character-based communication including an origination address of the second end-user device;

a message processing program residing on the first end-user device having an auto-reply generation method that is active to automatically transmit a predetermined reply message to another device upon receipt of a message from the another device;

storing in memory of the first end-user communication device a list of origination addresses to which the predetermined reply message has previously been transmitted;

upon receipt of the digital message from the second end-user device, determining if the origination address of the second end-user device is in the list of origination addresses;

upon a determination that the origination address of the second end-user device is in the list of origination addresses, inhibiting the auto-reply generation method from transmitting the predetermined reply message to the origination address of the second end-user device;

upon a determination that the origination address of the second end-user device is not in the list of origination addresses, adding the origination address of the second end-user device to the list and permitting the auto-reply generation method to transmit the predetermined reply message to the origination address of the second end-user device.

2. The method of claim 1 wherein the electronic character-based communication comprises one of a short messaging service (SMS) text message and an email.

3. The method of claim 2 wherein said first end-user communication device comprises a wireless handheld two-way communication device.

4. The method of claim 1 further comprising:

storing a second list in memory of the first end-user communication device where the second list contains information associated with electronic addresses, the second list being one of a permissive list and an exclusionary list;

upon the determination that the origination address of the second end-user device is not in the list of origination addresses, determining if the origination address of the second end-user device is associated with information in the second list;

upon the determination that the origination address of the second end-user device does not correspond to any information in the second list and the second list being an exclusionary list, or upon the determination that the origination address of the second end-user device does correspond to information in the second list and the second list being a permissive list, permitting the auto-reply generation method to transmit the predetermined reply message to the origination address of the second end-user device;

upon the determination that the origination address of the second end-user device does correspond to information in the second list and the second list being an exclusionary list, or upon the determination that the origination address of the second end-user device does not correspond to information in the second list and the second list being a permissive list, inhibiting the auto-reply generation method from transmitting the predetermined reply message to the origination address of the second end-user device.

5. The method of claim 4 wherein the information in the second list is created under the control of the user of the first end-user communication device.

6. A computer program product, comprising a computer usable tangible medium having a computer readable program code embodied therein, said computer readable program code adapted to be executed to implement a method for processing an electronic communication received by a first end-user communication device, the method comprising:

receiving the electronic character-based communication by the first end-user communication device where the electronic character-based communication comprises a digital message sent from a second end-user device, the electronic character-based communication including an origination address of the second end-user device;

a message processing program residing on the first end-user device having an auto-reply generation method that is active to automatically transmit a predetermined reply message to another device upon receipt of a message from the another device;

storing in memory of the first end-user communication device a list of origination addresses to which the predetermined reply message has previously been transmitted;

upon receipt of the digital message from the second end-user device, determining if the origination address of the second end-user device is in the list of origination addresses;

upon a determination that the origination address of the second end-user device is in the list of origination addresses, inhibiting the auto-reply generation method from transmitting the predetermined reply message to the origination address of the second end-user device;

upon a determination that the origination address of the second end-user device is not in the list of origination addresses, adding the origination address of the second end-user device to the list and permitting the auto-reply generation method to transmit the predetermined reply message to the origination address of the second end-user device.

7. The computer program product of claim 6 wherein the electronic character-based communication comprises one of a short messaging service (SMS) text message and an email.

8. The computer program product of claim 6 further comprising:

storing a second list in memory of the first end-user communication device where the second list contains information associated with electronic addresses, the second list being one of a permissive list and an exclusionary list;

upon the determination that the origination address of the second end-user device is not in the list of origination addresses, determining if the origination address of the second end-user device is associated with information in the second list;

upon the determination that the origination address of the second end-user device does not correspond to any information in the second list and the second list being an exclusionary list, or upon the determination that the origination address of the second end-user device does correspond to information in the second list and the second list being a permissive list, permitting the auto-reply generation method to transmit the predetermined reply message to the origination address of the second end-user device;

upon the determination that the origination address of the second end-user device does correspond to information in the second list and the second list being an exclusionary list, or upon the determination that the origination address of the second end-user device does not correspond to information in the second list and the second list being a permissive list, inhibiting the auto-reply generation method from transmitting the predetermined reply message to the origination address of the second end-user device.

9. The computer program product of claim 8 wherein the information in the second list is created under the control of the user of the first end-user communication device.

10. A first end-user wireless communication device that processes a received electronic communication, the device comprising:

a microprocessor controlled apparatus receives the electronic character-based communication by the first end-user communication device where the electronic character-based communication comprises a digital message sent from a second end-user device, the electronic character-based communication including an origination address of the second end-user device;

a message processing program implemented by the microprocessor controlled apparatus having an auto-reply generation method that is active to automatically transmit a predetermined reply message to another device upon receipt of a message from the another device;

memory of the first end-user communication device storing a list of origination addresses to which the predetermined reply message has previously been transmitted;

upon receipt of the digital message from the second end-user device, the microprocessor controlled apparatus determining if the origination address of the second end-user device is in the list of origination addresses;

upon a determination that the origination address of the second end-user device is in the list of origination addresses, the microprocessor controlled apparatus inhibiting the auto-reply generation method from transmitting the predetermined reply message to the origination address of the second end-user device;

upon a determination that the origination address of the second end-user device is not in the list of origination addresses, the microprocessor controlled apparatus adding the origination address of the second end-user device to the list and permitting the auto-reply generation method to transmit the predetermined reply message to the origination address of the second end-user device.

11. The first end-user wireless communication device of claim 10 wherein the electronic character-based communication comprises one of a short messaging service (SMS) text message and an email.

12. The first end-user wireless communication device of claim 11 wherein said first end-user communication device comprises a wireless handheld two-way communication device.

13. The first end-user wireless communication device of claim 10 further comprising:

the memory storing a second list where the second list contains information associated with electronic addresses, the second list being one of a permissive list and an exclusionary list;

upon the determination that the origination address of the second end-user device is not in the list of origination addresses, the microprocessor controlled apparatus determining if the origination address of the second end-user device is associated with information in the second list;

upon the determination that the origination address of the second end-user device does not correspond to any information in the second list and the second list being an exclusionary list, or upon the determination that the origination address of the second end-user device does correspond to information in the second list and the second list being a permissive list, the microprocessor controlled apparatus permitting the auto-reply generation method to transmit the predetermined reply message to the origination address of the second end-user device;

upon the determination that the origination address of the second end-user device does correspond to information in the second list and the second list being an exclusionary list, or upon the determination that the origination address of the second end-user device does not correspond to information in the second list and the second list being a permissive list, the microprocessor controlled apparatus inhibiting the auto-reply generation method from transmitting the predetermined reply message to the origination address of the second end-user device.

14. The first end-user wireless communication device of claim 13 wherein the information in the second list is created under the control of the user of the first end-user communication device.

* * * * *